United States Patent
Perreault

(10) Patent No.: US 7,306,727 B2
(45) Date of Patent: Dec. 11, 2007

(54) DISPOSABLE TANGENTIAL FLOW FILTRATION DEVICE HOLDER

(75) Inventor: Jeremy Perreault, Leominster, MA (US)

(73) Assignee: Millipore Corporation, Billerica, MA (US)

( * ) Notice: Subject to any disclaimer, the term of this patent is extended or adjusted under 35 U.S.C. 154(b) by 430 days.

(21) Appl. No.: 10/945,635

(22) Filed: Sep. 21, 2004

(65) Prior Publication Data

US 2006/0060518 A1 Mar. 23, 2006

(51) Int. Cl.
*B01D 63/08* (2006.01)
(52) U.S. Cl. .................. 210/321.6; 210/484; 210/488; 210/343
(58) Field of Classification Search ........... 210/321.61, 210/321.65, 321.72, 321.75, 321.84, 323, 210/343, 344, 440, 443, 484, 488, 493.3, 210/494.2, 439, 445, 321.64, 323.1, 231, 210/228, 456; 422/101, 102
See application file for complete search history.

(56) References Cited

U.S. PATENT DOCUMENTS

| | | | |
|---|---|---|---|
| 4,261,834 A | 4/1981 | DeWinter | 210/651 |
| 5,034,124 A | 7/1991 | Kopf | 210/231 |
| 5,049,268 A * | 9/1991 | Kopf | 210/231 |
| 5,096,582 A | 3/1992 | Lombardi et al. | 210/321.6 |
| 5,147,542 A * | 9/1992 | Proulx | 210/321.75 |
| 5,176,828 A * | 1/1993 | Proulx | 210/341 |
| 5,258,122 A * | 11/1993 | Ha et al. | 210/637 |
| 5,342,517 A * | 8/1994 | Kopf | 210/228 |
| 5,599,447 A * | 2/1997 | Pearl et al. | 210/321.75 |
| 7,094,346 B2 * | 8/2006 | Osenar et al. | 210/321.75 |

FOREIGN PATENT DOCUMENTS

EP 0 345 209 12/1989

OTHER PUBLICATIONS

The European Search Report dated Jan. 12, 2006.
Selection Guide System Data Sheet BP-1070; Filtration. Separation. Solution; Bio Pharmaceuticals, undated.
Manufacturing Conjugate Vaccines by Ian Sellick; BioProcess International; Apr. 2004 p. 33.

* cited by examiner

*Primary Examiner*—David Sample
*Assistant Examiner*—Delilah P Ardiente
(74) *Attorney, Agent, or Firm*—Nields & Lemack

(57) ABSTRACT

Tangential flow filtration device is provided wherein liners are provided between the filtration element and the top and bottom holders or manifolds. The liners incorporate the flow channels and inlet and outlet ports that were previously present in the manifolds. The liners are made of an inexpensive material and therefore are disposable after a single use, making it more cost effective to dispose of them than to clean the conventional manifolds. In addition, the liners can be pre-sterilized.

10 Claims, 4 Drawing Sheets

DISPOSABLE TANGENTIAL FLOW FILTRATION DEVICE HOLDER

BACKGROUND OF THE INVENTION

Tangential Flow Filtration (TFF) is a separation process that uses membranes to separate components in a liquid solution or suspension on the basis of size or molecule weight differences. Applications include concentration, clarification, and desalting of proteins and other biomolecules such as nucleotides, antigens, and monoclonal antibodies; buffer exchange; process development; membrane selection studies; pre-chromatographic clarification to remove colloidal particles; depyrogenation of small molecules such as dextrose and antibiotics; harvesting, washing or clarification of cell cultures, lysates, colloidal suspensions and viral cultures; and sample preparation.

In TFF, the solution or suspension to be filtered is passed across the surface of the membrane in a cross-flow mode. The driving force for filtration is the transmembrane pressure, usually created with a peristaltic pump. The velocity at which the filtrate is passed across the membrane surface also controls the filtration rate and helps prevent clogging of the membrane. Because TFF recirculates retentate across the membrane surface, membrane fouling is minimized, a high filtration rate is maintained, and product recovery is enhanced.

Conventional TFF devices are formed of a plurality of elements, including a pump, a feed solution reservoir, a filtration module and conduits for connecting these elements. In use, the feed solution is directed from the feed solution reservoir to the filtration module while the retentate from the filtration module is recirculated from the filtration module to the feed solution reservoir until the desired volume of retentate is obtained. The membrane is sandwiched between top and bottom manifolds or holders, which serve to provide accurate mechanical constraint against the internal hydraulic pressure of the device, and also serve to distribute the filtration stream across the multiple flow paths within the device. These manifolds or holders are typically made of stainless steel and must be cleaned and validated prior to each use, particularly in biopharmaceutical and other sanitary applications. This is an expensive and time-consuming process.

It would be desirable to provide a filtration device that eliminates the need for the aforementioned cleaning and validation steps when replacing the filtration medium.

SUMMARY OF THE INVENTION

In accordance with the present teachings, a tangential flow filtration device is provided wherein liners are provided between the filtration element and the top and bottom holders or manifolds. The liners incorporate the flow channels and inlet and outlet ports that were previously present in the manifolds. The liners are made of an inexpensive material and therefore are disposable after a single use, making it more cost effective to dispose of them than to clean the conventional manifolds. In addition, the liners can be pre-sterilized.

DETAILED DESCRIPTION OF THE INVENTION

Figure 1:
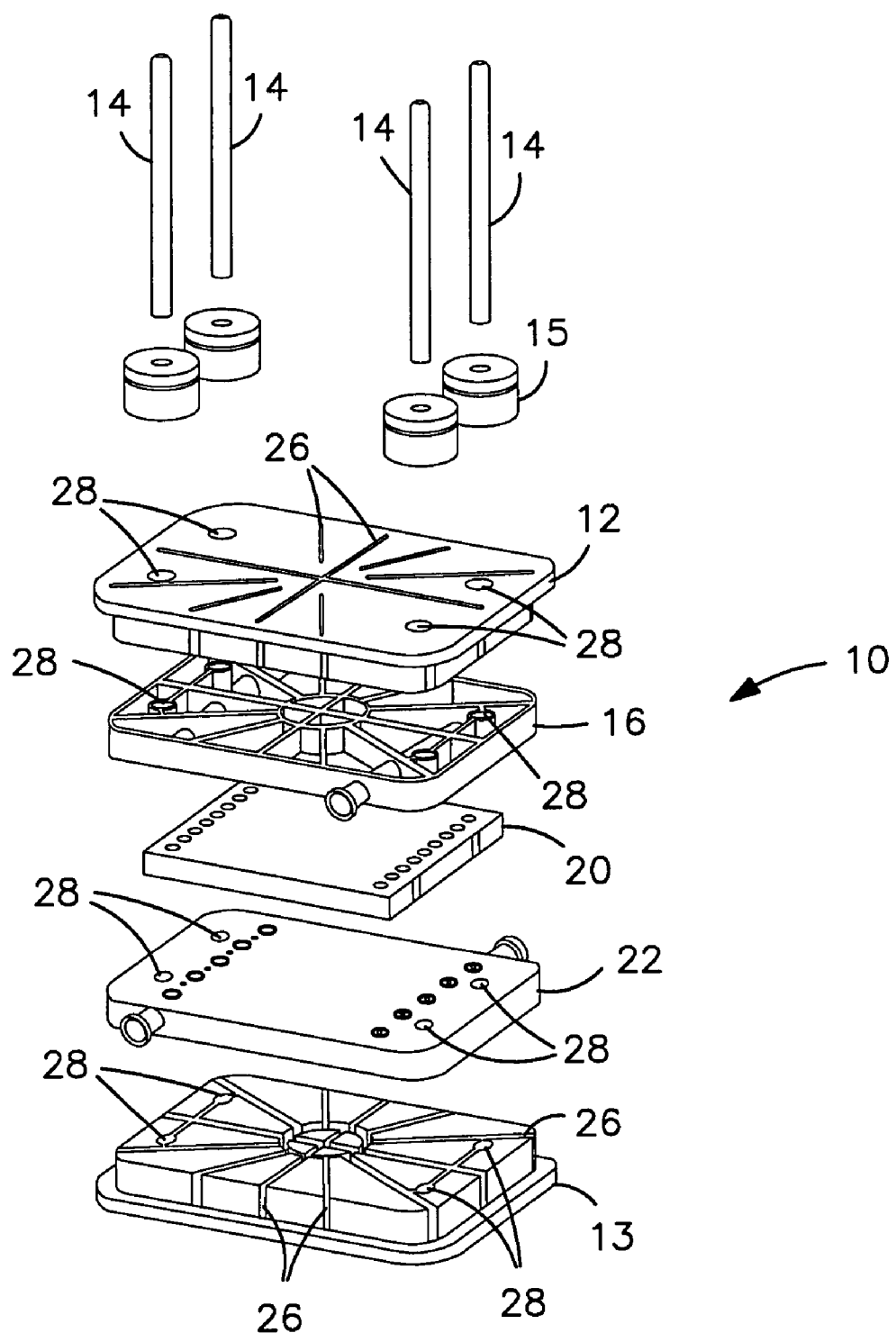
FIG. 1 is an exploded view of the filtration device in accordance with the present invention.

Turning first to FIG. 1, there is shown an exploded view of a filtration device 10 in accordance with the instant teachings. The device 10 includes a top holder plate 12 and a spaced bottom holder plate 13. The holder plates 12, 13 are preferably made of stainless steel and are sufficiently rigid and durable to provide accurate and effective mechanical constraint of the assembly against internal hydraulic operating pressures, such as 50-60 psi. Apertures 28 are provided in the holder plates 12, 13 and in each layer of the assembly to accommodate tie rods or threaded pins or bolts 14 or other clamping device to secure the assembly together. Spacers 15 are provided, and can be spring-loaded. No filtration stream passageways are present in the holder plates 12, 13.

Positioned beneath holder plate 12 in the assembled state is disposable liner 16. The liner 16 is preferably made of inexpensive material, suitable for the application, that is acceptable for pharmaceutical assays (and preferably is government approved). Suitable materials of construction include plastics, such as polystyrene, preferably polyolefins, such as polypropylene, polyethylene, copolymers and mixtures thereof. The liner 16 is preferably molded with passageways and openings. Alternatively, and less preferred, it may be formed by milling, drilling and other such methods.

As best seen in FIG. 2-5, the liner 16 includes a first port 17A, five sub-ports 17C a second port 17B and four sub-ports 17D. Port 17A is for introduction of feed or removal of retentate depending on its orientation within the assembly, with port 17B for removal of permeate, while preventing admixture of the filtrate with the retentate or feed, as is conventional. Port 17A is connected to the five sub-ports 17C in a manifold arrangement. Port 17B is connected to the four sub-ports 17D in a similar manner. Preferably the ports 17A and 17B are located on opposite sides of the liner as shown, in order to provide adequate spacing and avoid interferences with other components. However, in other applications, especially where spacing is sufficient or nor interference occurs, they may be located on the same side. Each port 17A, 17B is in fluid communication with flow paths or passageways that communicate with respective apertures to accommodate flow of feed, retentate or permeate as is conventional, thereby defining multiple flow paths for the filtration stream within the device.

Figure 3:
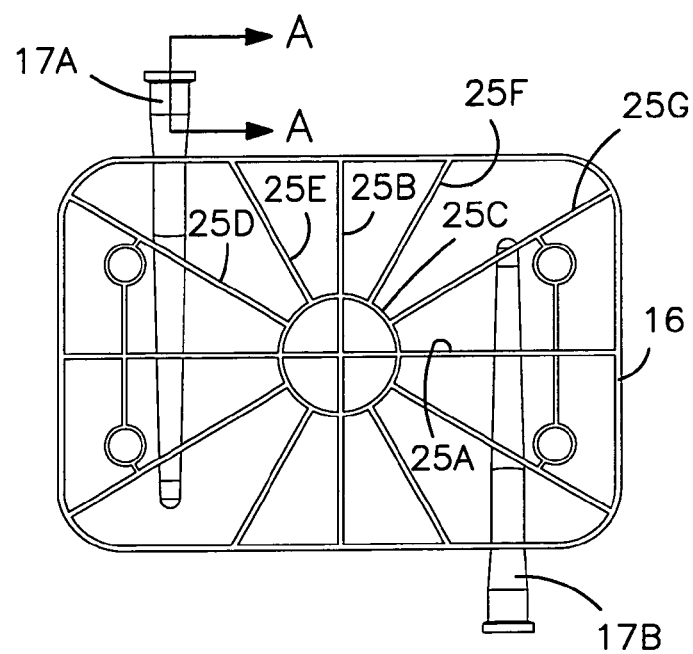
FIG. 3 is a top view of a liner in accordance with the present invention.
Figure 4:
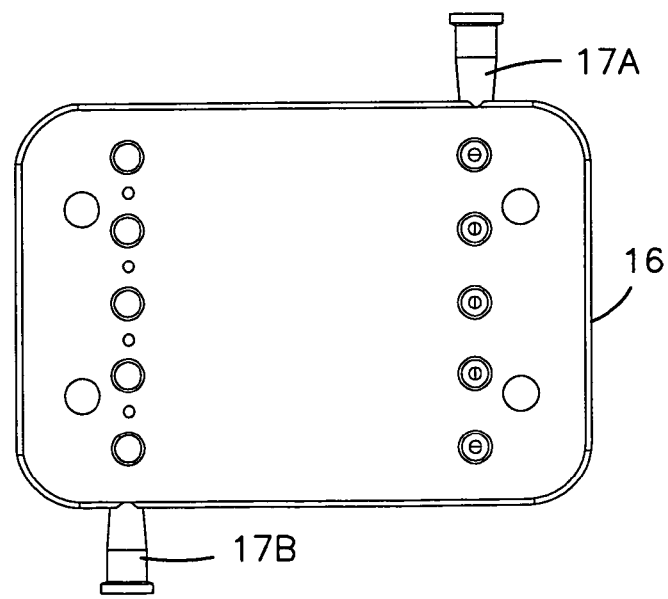
FIG. 4 is bottom view of a liner in accordance with the present invention.
Figure 5:
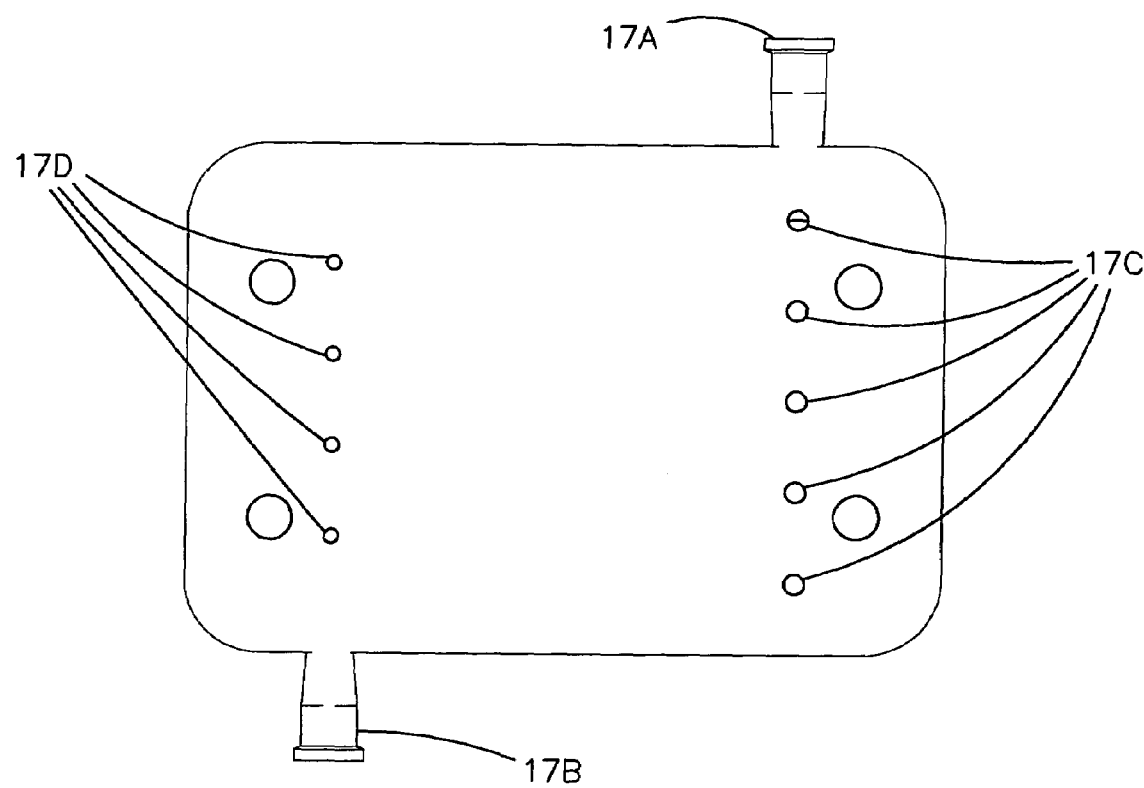
FIG. 5 a cross-sectional view of a liner in accordance with the present invention.

As seen in FIG. 3, the passageways are preferably tapered, narrowing as they proceed away from their respective port, to normalize pressure at each of the sub-ports 17C and 17D.

Turning back to FIG. 1, there is shown positioned below liner 16 a filtration element 20. The filtration element 20 can be a single membrane, and is preferably a plurality of stacked membranes, such as stacked ultrafiltration or microfiltration membranes, most preferably provided in the form of a cassette. Although a single cassette of membranes is shown, those skilled in the art will appreciate that multiple cassettes can be used. Suitable cassettes are sold under the name PELLICON® and are commercially available from Millipore Corporation.

Positioned below the filter element 20 is a second liner 22. Preferably the second liner 22 is identical in construction to the first liner 16, but is when the device is in the assembled state, the liner 22 is inverted relative to the position of the first liner 16, as shown. This allows Port 17A to communicate with the feed ports of the device in its normal orientation, while communicating with the retentate ports while in the inverted position. Port 17B of the liner communicates with the permeate ports in both orientations.

Figure 2:
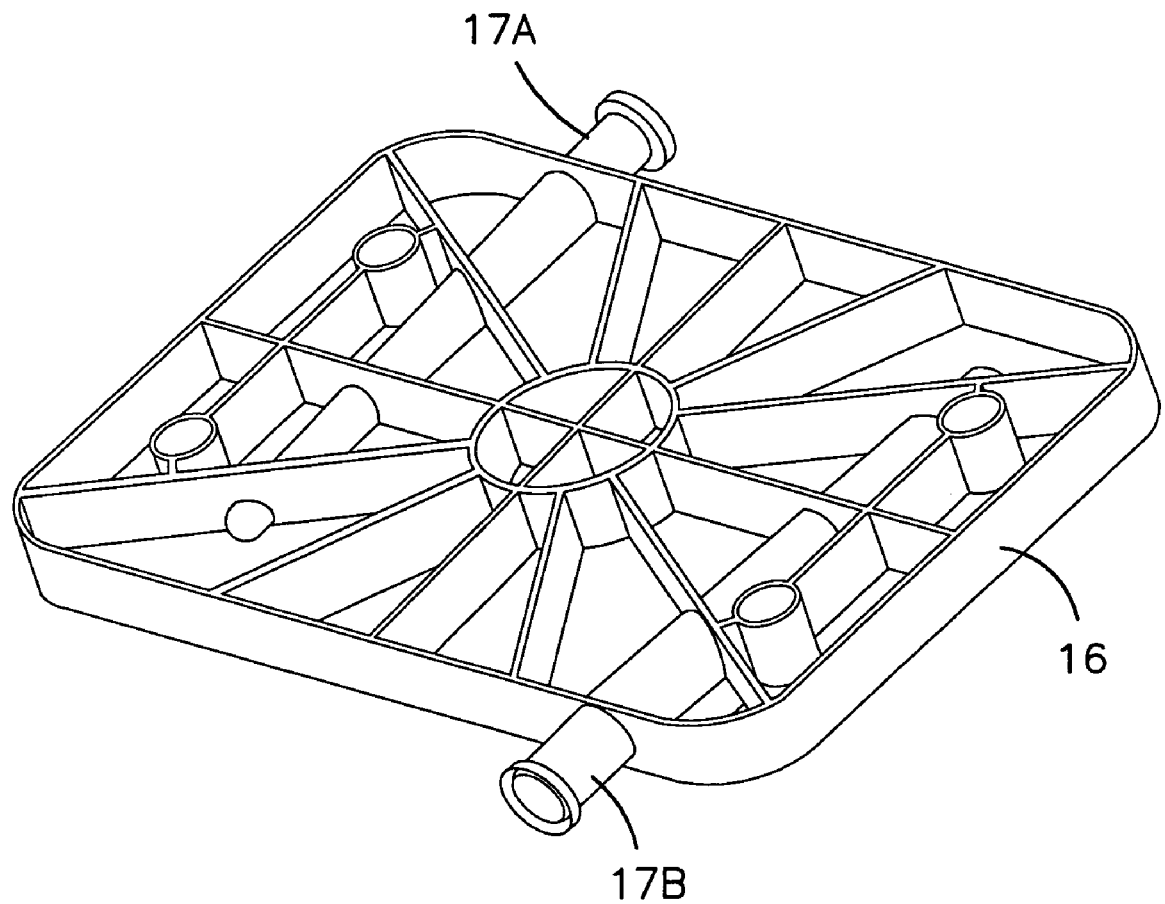
FIG. 2 is a perspective view of a liner in accordance with the present invention.

Preferably one side of the liners 16, 20 includes a plurality of ribs, as best seen in FIGS. 2 and 3. The ribs provide added rigidity to the liners, and are formed in the molding process. The ribs are positioned on the side of the liner that contacts the holder plate. In the rib configuration shown, a transverse rib 25A extends through the center of the liner the width of the liner. A rib 25B also extends through the center of the liner, perpendicular to rib 25A. The center of the liner is circumscribed by circular rib 25C, and two opposite and symmetrical sets of four spaced ribs 25D, 25E, 25F and 25G extend from circular rib 25C to the perimeter of the liner as shown. Those skilled in the art will appreciate that the embodiment shown is for illustrative purposes only; other rib configurations are within the scope of the present invention.

In order to properly and effectively assembly the liners in the filtration device of the invention, the holder plates 12, 13 preferably include a configuration of grooves 26 that correspond to the pattern of the configuration of ribs in the liner which is adjacent to it. When properly aligned, the ribs in each liner mate with the grooves in each respective holder plate to form an integral unitary assembly that can be sealed under pressure.

What is claimed is:

1. Filtration apparatus, comprising:
   a top plate;
   a bottom plate spaced from said top plate;
   a filtration member positioned between said top plate and said bottom plate;
   a first disposable liner positioned between said top plate and said filtration member, said first liner having a fluid inlet, a fluid outlet, a plurality of fluid inlet apertures, and a pattern of ribs on one side thereof facing said top plate;
   a second disposable liner positioned between said bottom plate and said filtration member, said second liner having a fluid inlet, a fluid outlet, a plurality of fluid outlet apertures and a plurality of ribs on one side thereof facing said bottom plate;
   wherein said top and bottom plates are devoid of fluid flow paths and each comprise a plurality of grooves which mate with the plurality of ribs on a respective liner.

2. The filtration apparatus of claim 1, wherein said first liner is made of a material selected from the group consisting of polystyrene, polyolefins, and copolymers and mixtures thereof.

3. The filtration apparatus of claim 1, wherein said second liner is made of a material selected from the group consisting of polystyrene, polyolefins, and copolymers and mixtures thereof.

4. The filtration apparatus of claim 1, wherein said first liner comprises a first port, a first plurality of sub-ports, a second port, and a second plurality of sub-ports, and wherein said first port is connected to said first plurality of sub-ports and said second port is connected to said second plurality of sub-ports.

5. The filtration apparatus of claim 4, wherein said first port is in fluid communication with a first passageway and said second port is in fluid communication with a second passageways, and wherein said first and second passageways narrow as they proceed away from their respective ports.

6. The filtration apparatus of claim 1, wherein said filtration member is a plurality of stacked membranes.

7. The filtration apparatus of claim 6, wherein said plurality of stacked membranes is contained in a cassette.

8. The filtration apparatus of claim 1, wherein said liner has a center and a width, and wherein said pattern of ribs on said first liner comprise a first rib extending through said center of said liner said width of said liner and a second rib extending through said center of said liner perpendicular to said first rib.

9. The filtration apparatus of claim 8, wherein said pattern of ribs further comprises a circular rib circumscribing said center of said liner.

10. The filtration apparatus of claim 9, wherein said pattern of ribs further comprises two opposite and symmetrical sets of four spaced ribs extending from said circular rib to the perimeter of said liner.

* * * * *